US009835747B2

(12) United States Patent
Imhof et al.

(10) Patent No.: US 9,835,747 B2
(45) Date of Patent: Dec. 5, 2017

(54) AUTOMATED INTERPRETATION ERROR CORRECTION

(71) Applicants: Matthias Imhof, Katy, TX (US); Ethan Nowak, McKinney, TX (US); Pavel Dimitrov, Houston, TX (US)

(72) Inventors: Matthias Imhof, Katy, TX (US); Ethan Nowak, McKinney, TX (US); Pavel Dimitrov, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 640 days.

(21) Appl. No.: 14/272,210

(22) Filed: May 7, 2014

(65) Prior Publication Data
US 2014/0358445 A1 Dec. 4, 2014

Related U.S. Application Data

(60) Provisional application No. 61/829,062, filed on May 30, 2013.

(51) Int. Cl.
G01V 1/00 (2006.01)
G01V 1/36 (2006.01)
G01V 1/32 (2006.01)
G01V 1/30 (2006.01)

(52) U.S. Cl.
CPC ............ G01V 1/362 (2013.01); G01V 1/302 (2013.01); G01V 1/325 (2013.01); G01V 2210/641 (2013.01); G01V 2210/643 (2013.01)

(58) Field of Classification Search
CPC .......... G01V 1/28; G01V 1/003; G01V 1/282; G01V 2210/57; G06T 15/06; G06T 15/08; G06T 15/83; G06T 17/005
See application file for complete search history.

(56) References Cited

U.S. PATENT DOCUMENTS

| 4,592,032 A * | 5/1986 | Ruckgaber ............ G01V 1/288 367/73 |
| 5,570,106 A | 10/1996 | Viswanathan |
| 5,999,885 A | 12/1999 | Van Bemmel et al. |
| 6,138,076 A | 10/2000 | Graf et al. |
| 6,757,216 B1 | 6/2004 | Varnai et al. |

(Continued)

FOREIGN PATENT DOCUMENTS

WO WO 2009/067330 5/2009

OTHER PUBLICATIONS

Patel, D. et al. (2010), "Seismic Volume Visualization," IEEE Pacific Visualisation Symposium, Taipei, Taiwan, 8 pgs.

Primary Examiner — Elias Desta
(74) Attorney, Agent, or Firm — ExxonMobil Upstream Research Company—Law Department

(57) ABSTRACT

A fully automated method for correcting errors in one interpretation (13) of seismic data based on comparison to at least one other interpretation (14) of the same subsurface region. The errors may occur in any feature of the seismic data volume, for example a horizon, surface, fault, polyline, fault stick, or geo-body. In some embodiments of the invention, an error may be a hole in a horizon (53), and the whole is patched by a piece of a horizon in another interpretation (55). In an alternative embodiment of the invention, a single interpretation may be used to repair itself, for example by identifying similarly shaped, adjacent horizons (67), and merging them (68).

13 Claims, 9 Drawing Sheets

(56) References Cited

U.S. PATENT DOCUMENTS

| | | |
|---|---|---|
| 7,013,218 B2 | 3/2006 | Baker et al. |
| 7,113,869 B2 | 9/2006 | Xue |
| 7,184,367 B2 | 2/2007 | Yin |
| 7,248,539 B2 | 7/2007 | Borgos et al. |
| 7,494,367 B2 | 2/2009 | Adachi et al. |
| 7,627,429 B2 * | 12/2009 | Li .................... G01V 1/30 702/11 |
| 7,961,551 B2 | 6/2011 | Robertsson et al. |
| 8,010,294 B2 | 8/2011 | Dorn et al. |
| 8,121,791 B2 | 2/2012 | Lazaratos et al. |
| 8,126,648 B2 | 2/2012 | Saltzer et al. |
| 8,213,261 B2 | 7/2012 | Imhof et al. |
| 8,255,165 B2 * | 8/2012 | Chu .................... G01V 1/32 367/73 |
| 8,447,524 B2 | 5/2013 | Chen et al. |
| 8,451,683 B2 | 5/2013 | Chu et al. |
| 2008/0285384 A1 | 11/2008 | Jmaes |
| 2010/0142323 A1 | 6/2010 | Gist et al. |
| 2011/0002194 A1 | 1/2011 | Imhof et al. |
| 2011/0048731 A1 | 3/2011 | Imhof et al. |
| 2011/0083844 A1 | 4/2011 | Oppert et al. |
| 2011/0115787 A1 | 5/2011 | Kadlec |
| 2011/0199860 A1 | 8/2011 | Houck et al. |
| 2012/0014217 A1 | 1/2012 | Houck et al. |
| 2012/0014218 A1 | 1/2012 | Houck et al. |
| 2013/0121111 A1 | 5/2013 | Kim et al. |
| 2013/0235695 A1 * | 9/2013 | Truelove .............. G01V 1/282 367/43 |

* cited by examiner

AUTOMATED INTERPRETATION ERROR CORRECTION

CROSS-REFERENCE TO RELATED APPLICATION

This application claims the benefit of U.S. Provisional Patent Application 61/829,062, filed May 30, 2013, entitled "Automated Interpretation Error Correction," the entirety of which is incorporated by reference herein.

FIELD OF THE INVENTION

This disclosure relates generally to the field of geophysical prospecting, and more particularly to the interpretation of seismic data. Specifically, the disclosure describes a method to correct a set of interpretations by automatic reassignment of portions of some interpretations to other interpretations.

BACKGROUND OF THE INVENTION

In the oil and gas industry, seismic prospecting techniques commonly are used to aid in the search for and evaluation of subterranean hydrocarbon deposits. A seismic prospecting operation typically proceeds in three separate stages: data acquisition, data processing, and data interpretation. Success of the prospecting operation often depends on satisfactory completion of all three stages.

In the data acquisition stage, a seismic source emits an acoustic impulse known as a seismic signal that propagates into the earth and is at least partially reflected by subsurface seismic reflectors (i.e., interfaces between underground formations having different acoustic impedances). The reflected signals (known as seismic reflections) are detected and recorded by an array of seismic receivers located at or near the surface of the earth, in an overlying body of water, or at known depths in boreholes.

During the data processing stage, raw seismic data recorded in the data acquisition stage are refined and enhanced using a variety of procedures that depend on the nature of the geologic structure being investigated and on characteristics of the raw data. In general, the purpose of the data processing stage is to produce an image of the subsurface from the recorded seismic data for use during the data interpretation stage. The image is developed using theoretical and empirical models of the manner in which the seismic signals are transmitted into the earth, attenuated by subsurface strata, and reflected from geologic structures.

The purpose of the data interpretation stage is to determine information about the subsurface geology of the earth from the processed seismic data. The results of the data interpretation stage may be used to determine the general geologic structure of a subsurface region, to locate potential hydrocarbon reservoirs, to guide the development of an already discovered reservoir, or to help manage hydrocarbon extraction operations.

Often, three-dimensional seismic data are a useful tool for seismic prospecting operations. As used herein, a three-dimensional seismic data volume is a three-dimensional volume of discrete x-y-z or x-y-t data points, where x and y are mutually orthogonal, horizontal directions, z is the vertical direction, and t is two-way vertical seismic signal travel time. In subsurface models, these discrete data points are often represented by a set of contiguous hexahedrons known as samples, cells or voxels, with each voxel representing a volume surrounding a single data point. Each data point, cell, or voxel in a three-dimensional seismic data volume typically has an assigned value (data sample) of a specific seismic data attribute such as seismic amplitude, acoustic impedance, or any other seismic data attribute that can be defined on a point-by-point basis. One column of such a volume is often called a seismic data trace or simply a trace, while a slice through such a volume is often called cross section, or simply section.

An interpreter analyzes the seismic data, for example by picking horizons, faults, or other surfaces. The interpreter may also pick polylines or geobodies (three-dimensional sets of connected samples). Polylines, surfaces, and geobodies are examples of interpretation objects, or simply interpretations or objects. The interpreter may perform these picking tasks in a manual manner or in an assisted or automated manner. Especially when using an automated technique, it is possible to generate a large number of interpretations in a relatively short time.

For example, Imhof et al. disclosed an algorithm that extracts essentially every event from a seismic dataset and assigns these events to surfaces (U.S. Patent Application Publication 2011/0048731, "Seismic Horizon Skeletonization"). Other methods for generating a large set of surfaces include U.S. Pat. No. 7,248,539, "Extrema Classification," to Borgos; U.S. Pat. No. 5,570,106, "Method and Apparatus for Creating Horizons from 3-D Seismic Data," to Viswanathan; and U.S. Patent Application Publication 2008/0285384, "System and Method for Displaying Seismic Horizons with Attributes," by James.

SUMMARY OF THE INVENTION

Interpretations can be affected by errors. Surfaces, for example, may terminate prematurely, extend beyond their limit, contain gaps or holes, exhibit cycle skips or track multiple events. Of course, it is possible to check a few interpretations manually for errors and re-interpret them as necessary, but checking many interpretations manually is challenging, and preferably, an automated error-checking and correction method such as the present inventive method is used. A large set of interpretations enables the correction of a problem in one interpretation by using at least a portion of a second interpretation.

In some embodiments of the invention, the interpreter generates many interpretations using automated techniques. Specified interpretations are automatically analyzed, artifacts are removed from the specified interpretations, and portions of other interpretations or entire other interpretations are used to plug the holes. Particular embodiments address the detection of various errors and the identification of suitable interpretations to plug the holes.

Aspects of the invention will be taught using the example of auto-tracked horizons. Practitioners of the art will appreciate that interpretations are not limited to horizons, but also include polylines, faults, other surfaces, geobodies, and others.

In one embodiment, the invention is a method for automated fixing of errors in a first interpretation of seismic data representing a subsurface region, comprising:
 (a) obtaining a second, independent interpretation of said seismic data or of another set of seismic data representing said same subsurface region;
 (b) searching the first interpretation for an error in a subsurface feature; and
 (c) fixing the error based on the second interpretation; wherein searching the first interpretation for an error and fixing the error are performed by a programmed computer after inputting of the first and second interpretations by a user.

In another embodiment, the invention is a method for automated fixing of errors in one or more interpretations of seismic data representing a subsurface region, comprising:
(a) searching the one or more interpretations for two adjacent surfaces having edges that are similarly shaped where the surfaces are adjacent, similarity being judged by a preselected tolerance criterion; and
(b) merging the two surfaces where the edges are similarly shaped; wherein searching the one or more interpretations and merging the two surfaces are performed by a programmed computer after inputting of the one or more interpretations by a user.

BRIEF DESCRIPTION OF THE DRAWINGS

The present invention and its advantages will be better understood by referring to the following detailed description and the attached drawings in which.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications, and equivalents that may be included within the scope of the invention, as defined by the appended claims.

DETAILED DESCRIPTION OF EXAMPLE EMBODIMENTS

Figure 1:
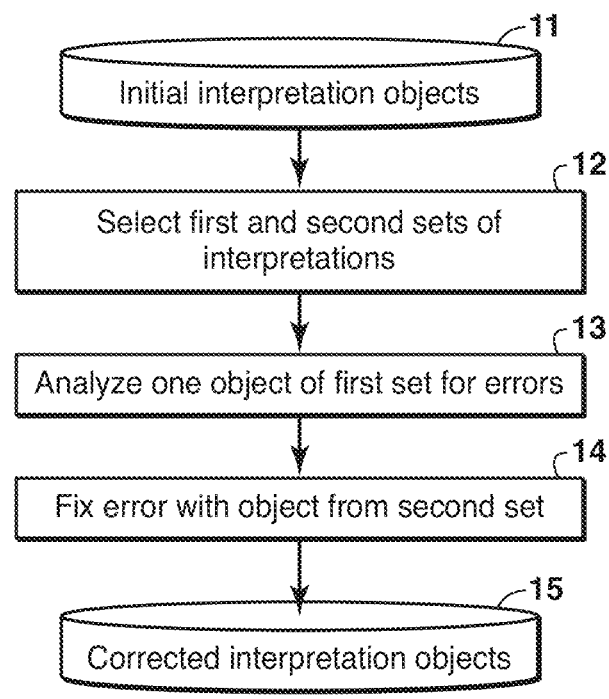
FIG. 1 is a flow chart showing basic steps in one embodiment of the present inventive method.

FIG. 1 is a flow chart showing basic steps in one embodiment of the present inventive method. The method converts an initial set of interpretations 11 to a corrected set of interpretations 15. The method begins with the selection of two sets of interpretations in step 12. The first set contains the interpretations that are to be corrected, while the second set contains the interpretations that are to provide the matter used for correction. An interpretation from the first set is examined for errors in step 13. It should be understood that as used herein, the term error includes apparent errors as well as unquestionable errors. In step 14, interpretations from the second set are examined for pieces or entire interpretations that fix the errors, and these are used to fix the errors. Optionally, steps 13 and 14 are repeated until interpretations within the first set cannot be fixed anymore. Other than user selection of the two or more interpretations, every step of the invention is preferably automated using a computer programmed to perform the steps.

Figure 2:
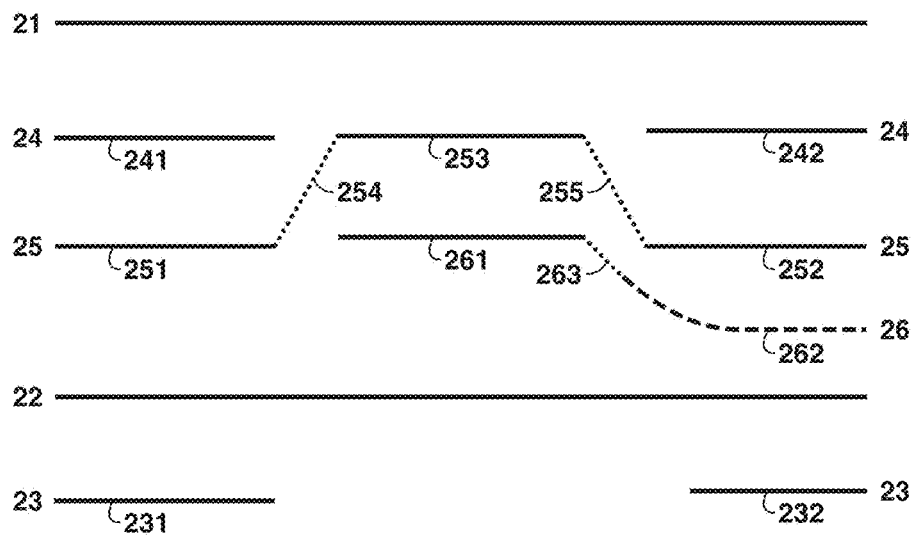
FIG. 2 is a schematic diagram of a seismic interpretation that needs to be corrected.
Figure 3:
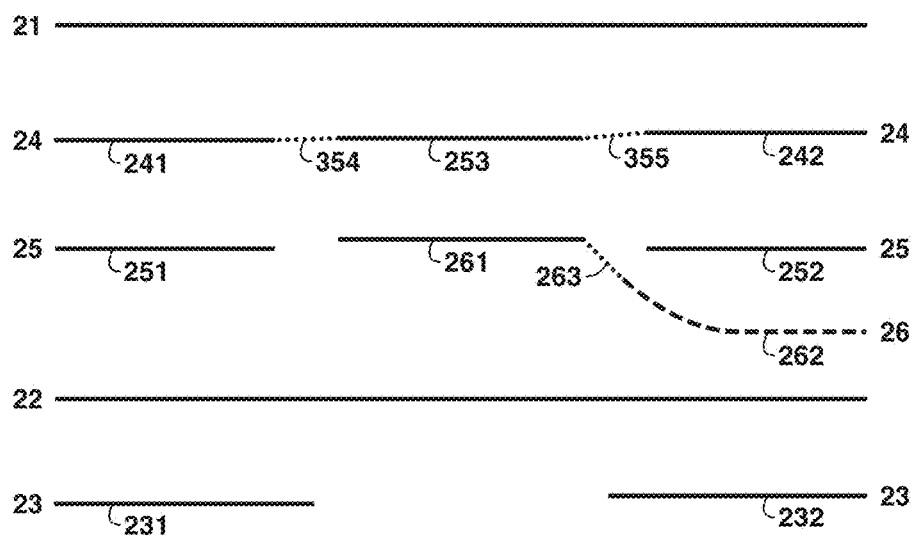
FIG. 3 is a schematic diagram showing the interpretation of FIG. 2 after being corrected once with the present inventive method.

In a preferred embodiment, a computer algorithm is used to extract essentially every horizon from a seismic dataset. A schematic result of the application of such an algorithm is shown in FIG. 2. Horizons 21 and 22 are recognized correctly as through-going surfaces. Horizon 23 is recognized to consist of two disconnected parts 231 and 232 that might be connected in the third dimension, but within the plane of the schematic cross section, there exists a hole or gap. Horizon 24 is recognized to consist of two disconnected parts 241 and 242 that might be connected in the third dimension, but within the plane of the schematic cross section, there exists a hole or gap. This gap could be plugged with 253, but 253 is part of horizon 25. Horizon 25 consists of 251 that links (254) with 253 that links (255) with 252. Breaking the links 254 and 255 would allow 253 to become part of 24 by linking 241, 253, and 242 through 354 and 355, as shown in FIG. 3.

Figure 4:
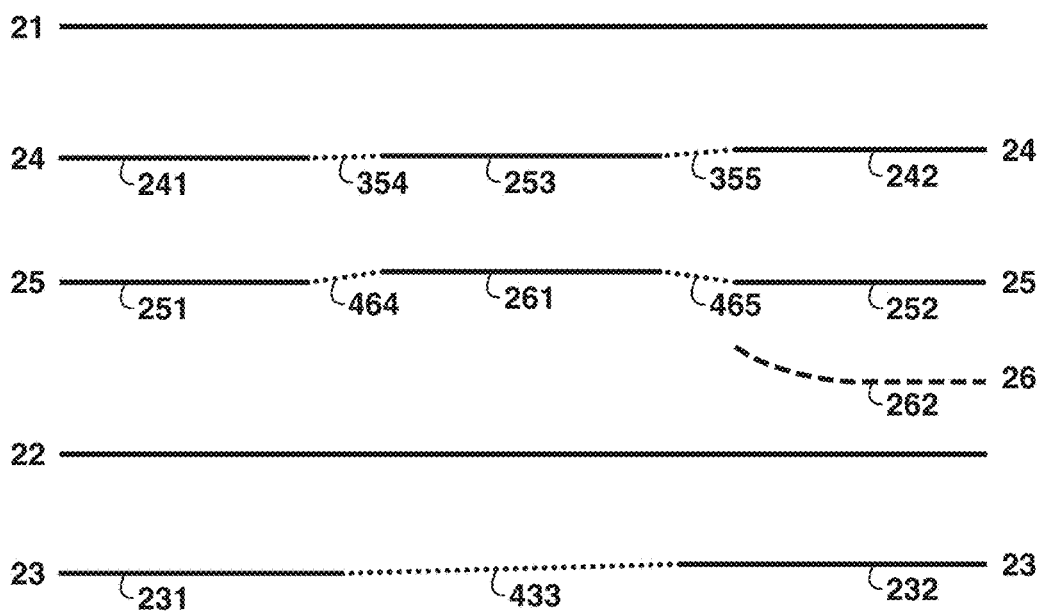
FIG. 4 is a schematic diagram showing the corrected interpretation of FIG. 3 after further corrections by the present inventive method.

With 253 reassigned, horizon 25 now exhibits a gap (FIG. 3). 261 would fill the gap, but 261 is part of 26 by virtue of 261 linked (263) to 262. FIG. 4 shows a corrected horizon 25 consisting of 251 linked (464) to 261 linked (465) to 252. Link 263 is removed, and horizon 26 consists of 262 only.

The original set of surfaces shown in FIG. 2 does not contain any surface that could fill the gap in 23. In some embodiments of the inventive method, surfaces that could not be fixed by reassigning portions of other surfaces are corrected by other means such as interpolation or picking a new surface that is used to fill the hole. An example is horizon 23 that is corrected with the newly picked or newly created surface 433 as shown in FIG. 4.

It should be understood that interpolation is not used in any embodiment of the present invention as the sole means of error correction.

The present inventive method starts with a set of initial interpretations 11. In the following, the method is described with horizons, but any interpretation object including polylines, fault sticks, channel axes, polygons, fault surfaces, or geobodies can be used. Preferably, the set is large enough to provide a rich collection of interpretations that can serve at least in parts to correct interpretational mistakes such as holes and gaps. A small set of interpretations may simply not contain the interpretations needed to fix a hole in another one. A manual interpretation process often consumes too much time to generate more than just a few interpretations objects. Preferably, an automated algorithm is used to generate the initial interpretation, for example, the extraction of all surfaces contained in a dataset. Automated interpretation, on the other hand, also tends to create more interpretation artifacts that may need fixing. Automated interpretation may both be the cause of the problems and provide the solution to addressing them.

Not every horizon in a large set of horizons is of equal interest. Often, only a few select large horizons out of the set of all (automatically generated) horizons are typically of interest to the interpreter. The first step 12 of the inventive method is the selection of a first set of horizons or interpretations from the complete set of initial interpretations 11. In some embodiments of the inventive method, an interpreter assigns select interpretations to this first set. In other embodiments, a computer algorithm selects the members of the first set based, for example, on size or location criteria.

A second set of interpretations is mined for entire interpretations or pieces thereof that are used to correct the interpretations of the first set. In one embodiment of the inventive method, the second set consists of all the interpretations from the initial set of interpretations 11 that were not selected for the first set of interpretations. In one embodiment, an interpreter or computer algorithm selects interpretations for the second set from all interpretations in the initial set. In another embodiment, an interpreter or computer algorithm selects interpretations for the second set from the interpretations in the initial set that were not selected for the first set. In one specific embodiment, the first and the second sets of interpretations are the same.

Both the first and the second set of interpretations are preferably derived from the same seismic data volume. As an example of how the present inventive method may work, complete or partial interpretations from the second set of interpretations are inserted into the first set of interpretations at the same x-y-z (or x-y-t) locations that they held in the second set of interpretations. Specifically, complete or partial interpretations from the second set of interpretations are attached to interpretations from the first set of interpretations at the same x-y-z (or x-y-t) locations that they originally held in the second set of interpretations.

In some embodiments of the inventive method, the members of the second set change during the automated error correction process. By removing a portion of an interpretation to be used as a patch, the remaining interpretation may separate into two or more parts. Some or all of the remaining parts may be added to the second set of interpretations. In some embodiments of the inventive method, a new interpretation is created and added to the second set if no interpretation is found in the second set to fill a hole in an interpretation of the first set. In some preferred embodiments, addressing a problem in an interpretation of the first set may require the removal of a portion of that interpretation. This removed part may be added to the second set. Examples are 253 and 261 that are removed from 25 and 26 to be used later to correct 24 and 25, and thus, are temporarily assigned to the second set.

Step 13 is the detection of problems with interpretations from the first set, which will be followed by step 14, fixing the problems with (pieces of) interpretations from the second set. In some embodiments, all surfaces of the first set are analyzed first, problems are then listed, marked, or enumerated; and afterwards all the problems are fixed simultaneously. In some embodiments, one interpretation is selected and analyzed, one problem is identified, and this one problem is fixed. This process repeats until every problem on every surface of the first set has been addressed. In some embodiments, one interpretation is selected and analyzed, one problem is identified, and this one problem is fixed. This process repeats until a specified number of surfaces of the first set have been corrected. In a preferred embodiment, surfaces from the first set are selected one at a time; holes in the selected surface are identified one at a time and a suitable surface from the second set is identified that (at least partially) fills the hole; the hole is filled and any remainders of the second surface are returned to the second set.

Using the example of correcting horizons, problems with interpreted horizons include cycle skips, holes and gaps caused by improper assignment to another horizons, or data quality issues. 253 is an example of a cycle skip generated by the auto tracker mistakenly jumping from 25 onto 24. 25 exhibits a hole caused by 261 mistakenly being tracked to 26. Lastly, 23 exhibits a hole, caused for example by insufficient data quality.

Cycle skips can be converted to holes by identification of the skip and removal of the erroneous portions of the horizon. Preferably, a preprocessing step is applied that identifies cycle skips and reassigns the erroneous portions to new horizons which create holes or gaps in the original horizons. In one embodiment, all the horizons of the initial set are examined for cycle skips, cycle skips are identified, and erroneous portions are reassigned to new horizons. For performance reasons, preferably only horizons of the first set are examined for cycle skips and the erroneous portions are reassigned to new horizons that are added to the second set where they can be recycled such as 253 fixing the hole in 24.

Some embodiments of the present inventive method combine identification of cycle skips, removal of erroneous portions, and fixing with suitable pieces from other horizons into one step. A first application of the inventive process may fix cycle skips. A second application may fix holes and gaps. A third application may fix yet another problem. In a preferred alternative, different preprocessing steps are applied to reduce problems to holes.

When such preprocessing is used, the main purpose of step 13 is the detection of holes in horizons, where the term hole is used in a generalized sense connoting an interior hole as well as beyond the given samples of the horizon, i.e., outside of the horizon. One method is the application of an edge detector. A particular method of edge detection for the identification of holes is selection of a connectivity criterion and detection whether a sample is an interior sample or a boundary sample or edge sample based on number of samples surrounding it. For the example of horizons and a four-connectivity criterion, a sample on the horizon but with fewer than four neighbors is an edge sample next to a hole, gap, or the end of the horizon. Yet another method to identify holes is by comparison of the horizon with an appropriate mask, for example by interpolation or extrapolation of the horizon, or by morphological erosion or thinning that removes boundary samples.

Figure 5:
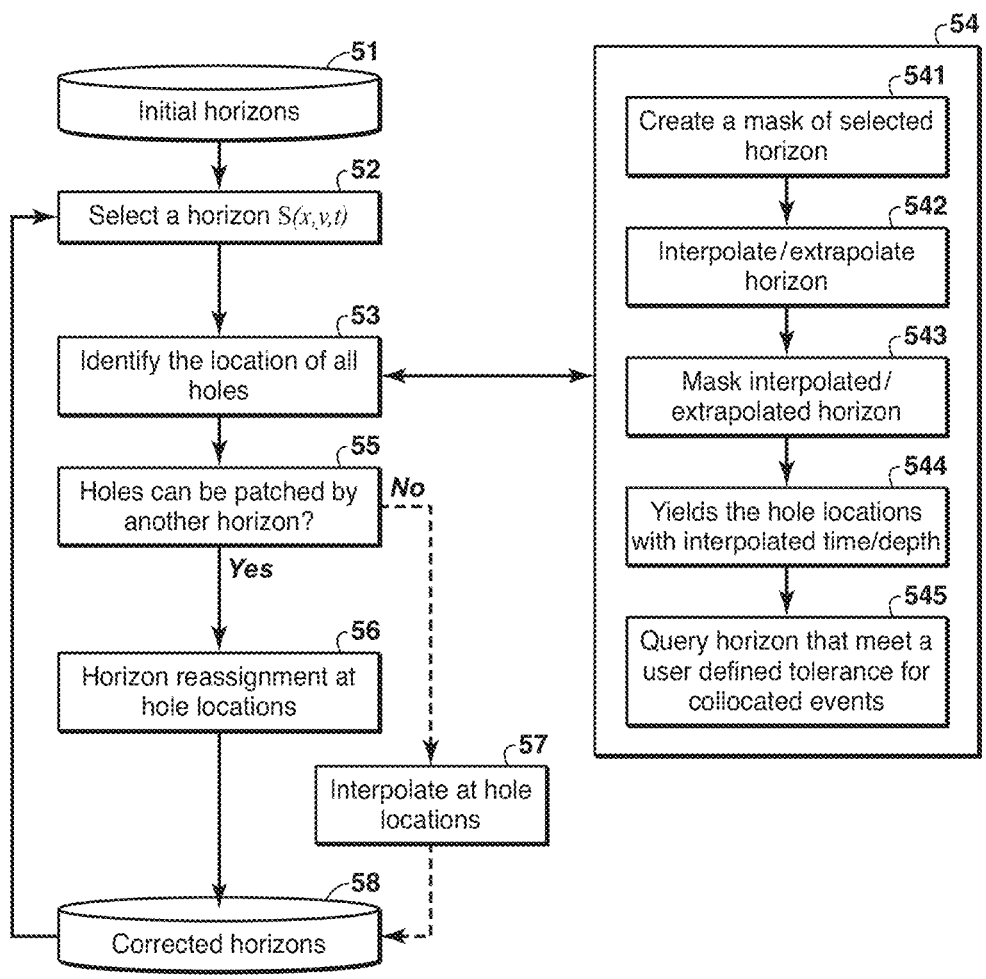
FIG. 5 is a flow chart showing basic steps in an embodiment of the invention directed to seismic horizon analysis and error correction.

Basic steps in one particular embodiment of locating holes and plugging them are shown in FIG. 5. The first and second sets are identical (51). The process begins at step 52 with the selection of a horizon to be corrected and identification of its holes in step 53. Some holes may be fixable by reassignment of pieces from other horizons. In step 55, a search is conducted for such a candidate horizon to fill a specified hole in the selected horizon. If an entire collocated horizon or at least a part of a collocated horizon is suitable to fill the hole, then this horizon or portion thereof is reassigned to the specified horizon in step 56.

In a preferred embodiment, if no other horizon meets the specified tolerance criterion, then the hole attempted to be filled by automated tracking on the original data volume seeded by the boundary or edge samples of the horizon to be corrected. In another embodiment, if no other horizon meets the specified tolerance criterion, then the hole is filled by interpolation (step 57) of times (or depths). Reassignment or retracking are preferred, however, because they preserve details of the horizons and prevent interpolation artifacts.

A preferred embodiment of hole identification and selection of a suitable candidate to fill the hole is shown in box

54. First, at step 541, a mask of the selected horizon is created by use of a flood filling process that fills all holes in the interior of the horizon. Then the selected horizon is interpolated and/or extrapolated at step 542 to the extent of the mask (step 543) to predict the time (or the depth) of missing events. The mask minus the interpolated/extrapolated horizon yields the hole locations (step 544) with interpolated travel times (or depths). At hole locations, the other horizons are tested at step 545 for collocation within a user-defined tolerance such as tolerance≤min[abs[horizon time−interpolated horizon time]].

This process iteratively repeats until all surfaces of the initial set 51 have been evaluated and, as much as possible, corrected (58).

Surface interpolation may be performed by casting the problem in the form of a Laplace equation (a partial differential equation, or "PDE"); so this approach is referred to as the harmonic interpolation/extrapolation.

$$\frac{\partial H}{\partial x} + \frac{\partial H}{\partial y} = 0$$

The method begins by identifying the domain of the surface—which pixels should be assigned a height value—and seeks to define a height value for each pixel in that domain, denoted by the function H(x, y) above. Then, pixels with prescribed values are extracted and used as the boundary conditions for the PDE. Solving the equation produces values that are as prescribed for pixels on the boundary and extrapolated (or interpolated) everywhere else. The result may be further processed to (optionally) remove some of the pixels.

Figure 6:
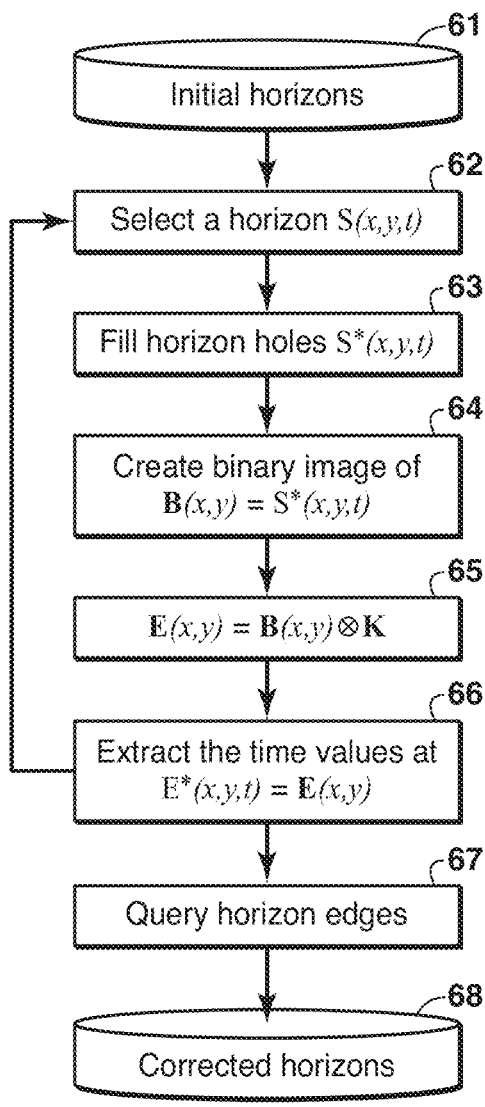
FIG. 6 is a flow chart showing basic steps in a method for correction of seismic horizon pairs having adjacent edges that interlock like puzzle pieces.

Some automated horizon pickers tend to create pairs of horizons, whose edges fit like two puzzle pieces along some parts of their edges but then the edges begin to diverge leading to overlapping horizons or gaps between the horizons. Another preferred embodiment of the inventive method addresses this problem, and basic steps in this embodiment are shown in the flowchart of FIG. 6. First, a horizon is selected in step 62 from a set of initial horizons 61, and its internal holes are filled in step 63, for example by flood filling, and a binary mask (or image) of the filled horizon is created at step 64. An edge detector is applied to the mask, for example by counting the number of connected neighboring samples, by subtraction of a morphologically eroded mask, or by convolution with an edge detection filter (shown in step 65) such as a Laplacian matrix or application of the Sobel method, the Prewitt method, the Roberts method or any of the standard edge detectors used in image processing, for example, the Laplacian matrix $$K = \begin{bmatrix} 0 & 1 & 0 \\ 1 & -4 & 1 \\ 0 & 1 & 0 \end{bmatrix}.$$

The time (or depth) at these edges can be extracted from the initial horizon to generate a three dimensional representation of the edge of the selected surface (step 66). The results are edges outlines that can be matched (i.e., having essentially the same depth/time at given x-y locations) at step 67. The time (or depth) difference between adjacent edge points is then calculated and those that meet a specified tolerance criterion are combined. An example tolerance criterion is tolerance≤min[abs[horizon 1 time−horizon 2 time]].

Two surfaces with sufficiently matching outlines are combined. Areas of overlap are preferably pruned and sent to the secondary set.

Figure 7:
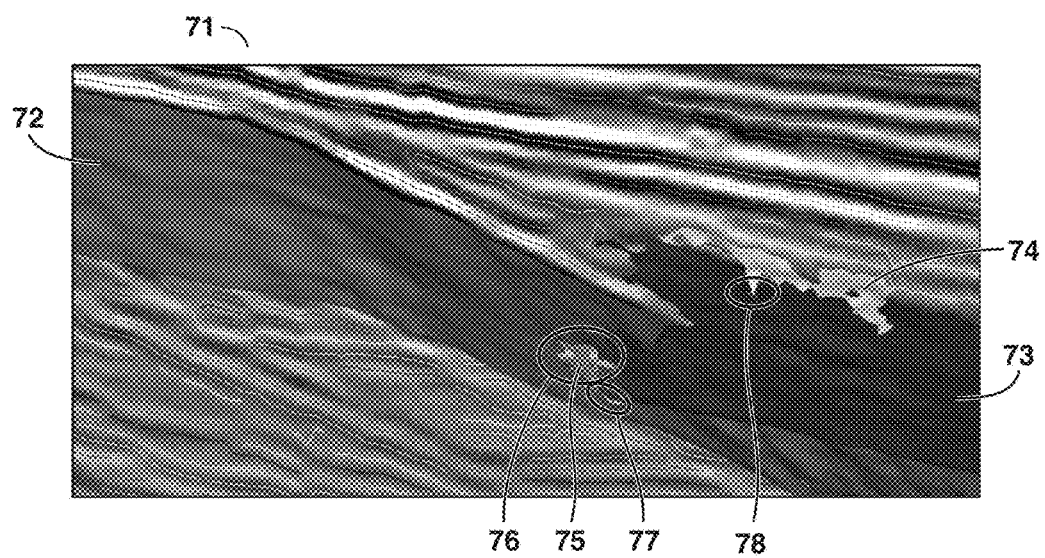
FIG. 7 shows an example of surfaces from a seismic data volume that need to be corrected.

FIG. 7 demonstrates an example application of the present inventive method. For a seismic dataset, hundreds of surfaces are automatically picked by a computer algorithm. The lines on the seismic cross section 71, which cuts through the seismic data volume, represent the intersections of picked surfaces with the cross section. Of all these surfaces, four surfaces, 72, 73, 74 and 75, are shown in a perspective view. Surface 72 contains two holes, 76 and 77. Surface 73 contains hole 78. Automated analysis of surfaces 73, 74, and 75 reveals cycle skips where the surfaces jump from one event to another as indicated by high gradients or excessive vertical differences between samples. For the error 76, the cycle-skipped part of 75 can be seen hovering over surface 72. For errors 77 and 78, the cycle-skipped portion of surfaces 72 and 73 are the few samples of 73 and 74 that drop down to the levels of surfaces 72 and 73. Cycle-skipped portions of surfaces are cut from the original surfaces and assigned to new surfaces.

A first set of interpretations is formed from surface 72, the principal portion of surface 73 without cycle skips, and the principle portion of surface 74 without cycle skips. A second set of interpretations is formed from the cycle-skipped portion of surface 73, the cycle-skipped portion of surface 74, and the principal and cycle-skipped portions of surface 75.

In practice, the separation of the initial set of interpretations into two sets of interpretations is achieved in three steps. First, each surface of the initial set of interpretations is assigned to a first set of interpretations or a second set of interpretation based on their size. Surfaces of a size exceeding a specified threshold are assigned to the first set, while surfaces falling short of the specified threshold are assigned to the second set of interpretations. Second, the surfaces assigned to the first set of interpretations are analyzed for cycle skips. Portions of surfaces that exhibit cycle skips are detached, assigned to new surfaces and moved into the second set of interpretations. Third, the surfaces assigned to the second set of interpretations are analyzed for cycle skips. Portions of surfaces that exhibit cycle skips are detached, assigned to new surfaces and allotted to the second set of interpretations.

The present inventive method then proceeds by analyzing the surfaces in the first set of interpretations for errors, or more specifically holes. For each hole, the algorithm attempts to find a matching surface from the second set of interpretations. If a matching surface is found, then the hole is plugged by assigning the picks from the matching surface in the second set to the punctured surface in the first set.

Figure 8:
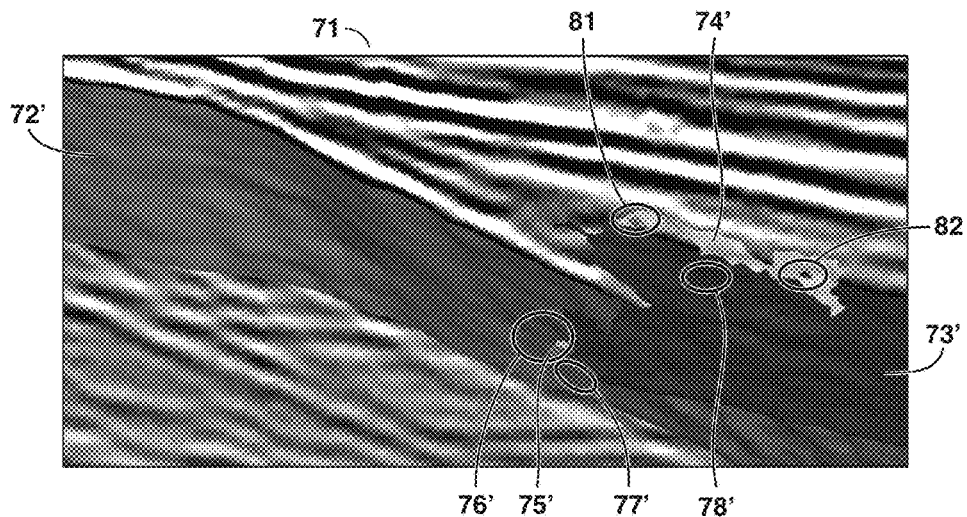
FIG. 8 presents the surfaces of FIG. 7 after hole filling.

FIG. 8 presents the surfaces of FIG. 7 after filling the holes with portions of other surfaces. Surface 72' is completely fixed; the holes at 76' and 77' are gone. Similarly, surface 73' is fixed; the hole at 78' is gone. All that remains of the original surface 75 is the small portion 75' that could not be reassigned to another surface. Moreover, all the cycle skips have disappeared. Comparison of 75 and 75' shows that the cycle skip or apparent kink in 75 has been removed by using the lower part of 75 to fill the hole 76, while the upper part of 75 has been reassigned to 75'. Comparison of 73 and 73' shows that the cycle skip or jagged edge on 73 has been corrected by using the offending samples to fill hole 76. Comparison of 74 and 74' shows that the cycle skip or downward jab has been corrected by assigning the offending samples to fill hole 78. Surface 74' formed by removing the cycle skips from surface 74 still exhibits two holes 81 and 82 because no surfaces were found in the second set of interpretations that matched these holes.

Figure 9:
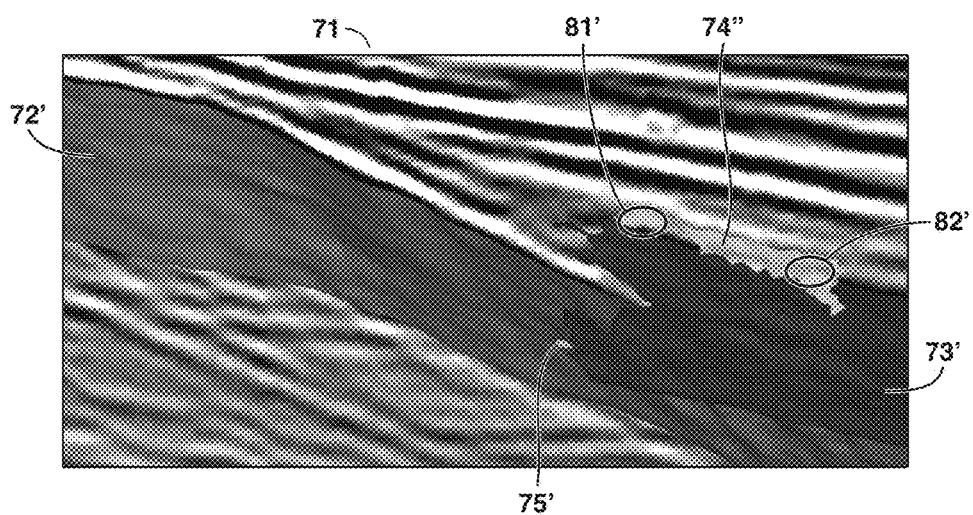
FIG. 9 presents the surfaces of FIG. 8 after optional interpolation.

FIG. 9 presents the surfaces of FIG. 8 after the optional step of filling the remaining holes, e.g., 81 and 82, by interpolation. The interpolated surface 74" is now completed; the holes are filled with patches 81' and 82'.

Figure 10:
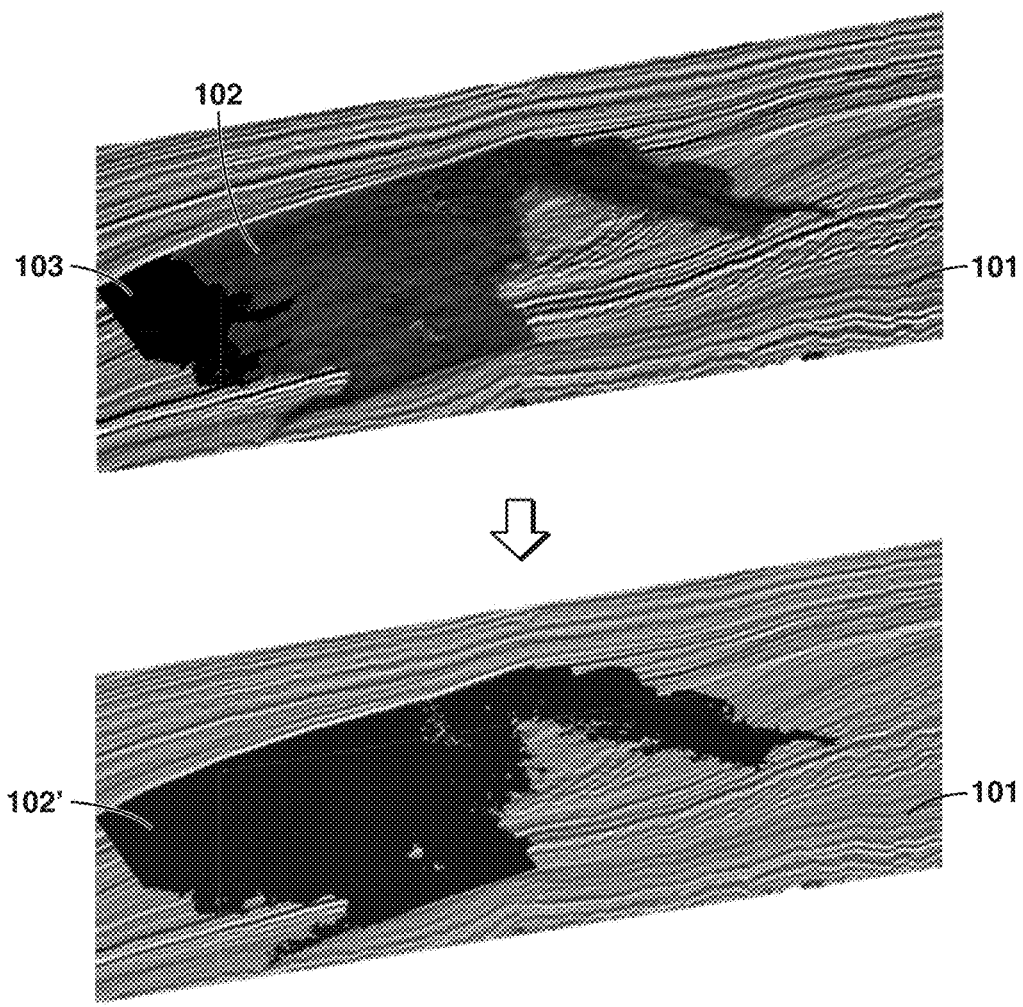
FIG. 10 presents an example of two surfaces picked from a seismic data volume that fit together like pieces of a puzzle.
Figure 11:
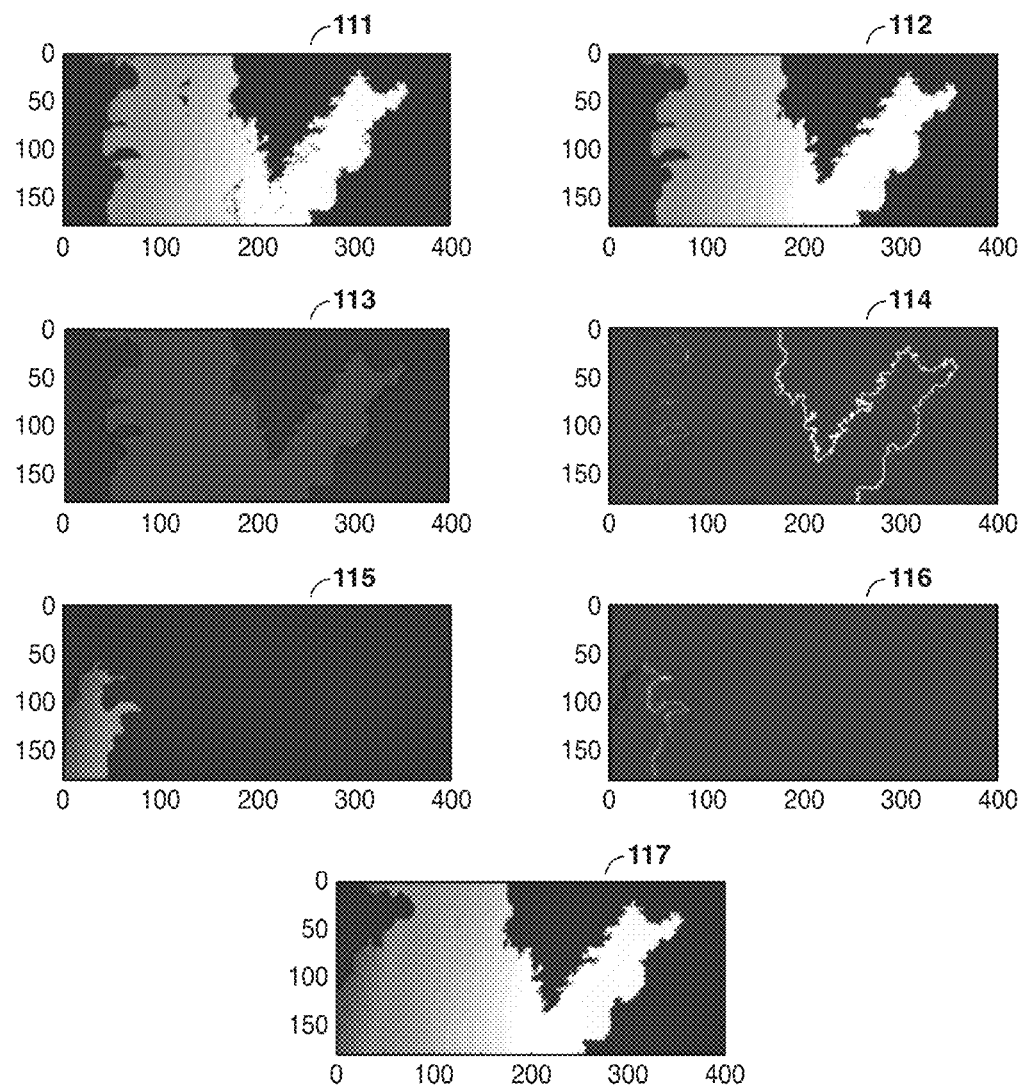
FIG. 11 presents an example application of a specific embodiment of the present inventive method in which two horizons with edges like adjoining pieces from a jigsaw puzzle are corrected.

FIG. 10 presents an exemplary application of a specific embodiment that corrects surfaces by combination of two surfaces that fit together like puzzle pieces. FIG. 10 shows the seismic cross section 101 cutting through a seismic data volume. An automated algorithm is used to pick every surface in the dataset, including the surfaces 102 and 103 shown in a perspective view intersecting the seismic cross section. The two surfaces 102 and 103 fit together like puzzle pieces and are combined into surface 102' with a specific embodiment of the present inventive method.

The process begins by assigning every surface to the second set of interpretations. Surfaces that exceed a specified size threshold are also assigned to the first set of interpretations. Large surfaces are thus members of both sets, while small surfaces are members of the second set only. One at a time, a surface from the first set of interpretations is selected, for example the surface shown in map view 111. Holes in this surface are filled by reassignment of picks from other surfaces or by interpolation resulting in a hole-free surface shown in view 112. The color shading in 111 and 112 indicates depth, where red shades are deep, while green shades are shallow. (Due to patent law restrictions, FIGS. 7-11 are black and white reproductions of colored displays.) The surface is converted to a binary image shown in 113 where a value of 1 indicates that the surface exists in this location, while a value of 0 indicates that the surface was not picked at that location. The binary image is convolved with a Laplacian filter to detect the outside edge of the surface, and the edge is mapped back into space by reassignment of the depth values of the edges in 114.

A surface from the second set is selected, for example, the surface shown in view 115. This surface is also converted to an edge contour shown in view 116. The two contours in views 114 and 116 are now compared to determine if and how much the two contours match. If the length of the matching contours exceeds a specified threshold, then the two surfaces are combined into one surface shown in view 117. Regions where the surfaces in views 112 and 115 overlap or where the two contours in views 114 and 116 cross each other are either averaged, removed, or assigned to new surfaces that are allotted to the second set of interpretations.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. A method for automated fixing of errors in a first interpretation of seismic data representing a subsurface region, comprising:
   obtaining a second, independent interpretation of said seismic data or of another set of seismic data representing said same subsurface region;
   searching the first interpretation for an error in a subsurface feature, wherein the error is a result of a computer implemented automated interpretation process that generated the first interpretation; and
   fixing the error based on the second interpretation, wherein the error is cycle skip, a hole, or a gap found in the subsurface feature, and wherein the fixing includes,
      identifying a candidate horizon in the second interpretation,
      creating a mask of the candidate horizon,
      predicting time or depth of a missing event by interpolating or extrapolating the candidate horizon to the extent of the mask, and
      comparing the mask to the interpolated or the extrapolated candidate horizon to identify a location of the cycle skip, hole, or gap;
   wherein searching the first interpretation for an error and fixing the error are performed by a programmed computer after inputting of the first and second interpretations.

2. The method of claim 1, wherein said subsurface feature is one or more of a group consisting of surfaces, horizons, faults, polylines, fault sticks, and geo-bodies.

3. The method of claim 1, wherein the subsurface feature is a horizon and the error is one of a cycle skip, a hole and a gap, caused by improper assignment to another horizon or by a data quality issue.

4. The method of claim 1, wherein the searching of the first interpretation is performed one horizon at a time, looking for one or more holes.

5. The method of claim 4, wherein a hole found in a horizon is filled by a patch removed from the second interpretation at the same spatial location as the hole.

6. The method of claim 5, wherein the fixing of the error based on the second interpretation comprises searching the second interpretation for a horizon at the same depth as the horizon with the hole in the first interpretation.

7. The method of claim 1, further comprising obtaining at least a third interpretation of seismic data representing the subsurface region, and using the third interpretation as an additional basis for fixing errors in the first interpretation.

8. The method of claim 1, wherein the fixing of the error based on the second interpretation comprises reassigning all or a portion of one subsurface feature in the second interpretation to the subsurface feature with the error.

9. The method of claim 1, wherein the first and second interpretations are obtained by identifying a plurality of surfaces in a volume of the seismic data, and then assigning each of the surfaces to at least one of the first interpretation and the second interpretation.

10. The method of claim 9, wherein the assignments are based on size of the surfaces.

11. A method for automated fixing of errors in one or more interpretations of seismic data representing a common subsurface region, comprising:
   obtaining the one or more interpretations of seismic data representing the common subsurface region, which are created by a computer implemented automated interpretation process, wherein the automated interpretation process creates two adjacent surfaces with an error in which the adjacent surfaces overlap or have a gap between them;
   selecting, with a programmed computer, a first surface;
   filling, with a programmed computer, internal holes in the first surface and creating a filled surface;

creating, with a programmed computer, a binary mask of the filled surface;
applying, with a programmed computer, an edge detector to the binary mask;
extracting, with a programmed computer, time or depth of an edge from the first surface and creating an outline of the edge from the first surface;
searching the one or more interpretations of the seismic data representing the common subsurface region for the two adjacent surfaces, one being the first surface, which have edges that are similarly shaped where the surfaces are adjacent, similarity being judged by a preselected tolerance criterion; and
merging the two adjacent surfaces where the edges are similarly shaped, wherein the merging is based on the outline of the edge from the first surface;
wherein the searching the one or more interpretations and the merging the two adjacent surfaces are performed by a programmed computer after inputting of the one or more interpretations by a user.

12. The method of claim 1, further comprising: generating and displaying an image of the subsurface region with the two adjacent surfaces having been merged.

13. The method of claim 11, further comprising: generating and displaying an image of the subsurface region with the error having been fixed.

* * * * *